July 21, 1925.
J. A. LARSON
GLASS FLOAT
Filed Aug. 16, 1924
1,547,052
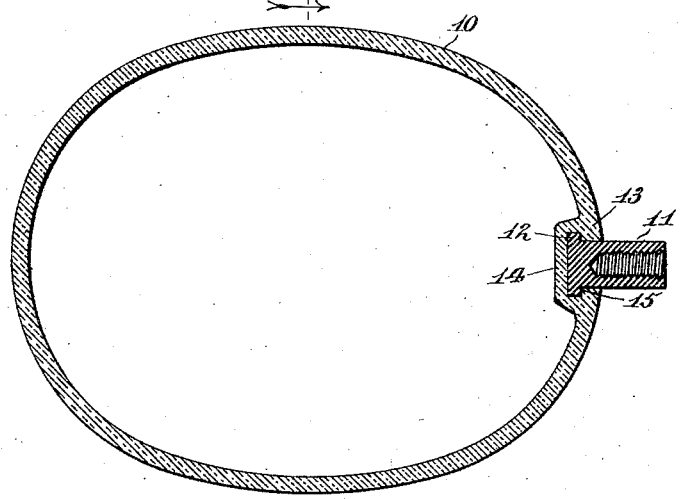
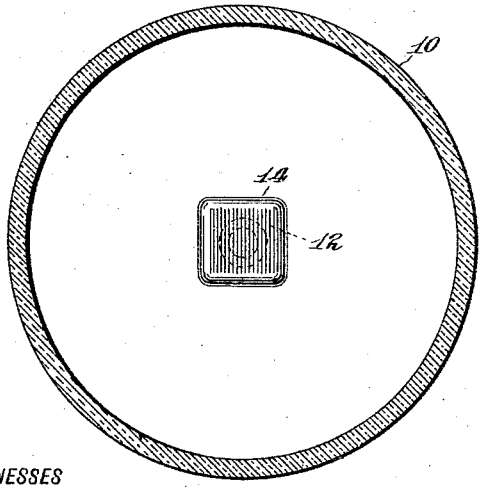
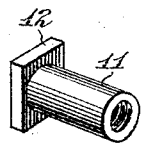
WITNESSES
INVENTOR
John A. Larson
BY
ATTORNEYS Patented July 21, 1925.

1,547,052

UNITED STATES PATENT OFFICE.

JOHN A. LARSON, OF BRYN ATHYN, PENNSYLVANIA, ASSIGNOR TO PIERRE R. FALK, OF ELMHURST, NEW YORK.

GLASS FLOAT.

Application filed August 16, 1924. Serial No. 732,452.

*To all whom it may concern:*

Be it known that I, JOHN A. LARSON, a citizen of the United States, and a resident of Bryn Athyn, in the county of Montgomery and State of Pennsylvania, have invented a new and Improved Glass Float, of which the following is a full, clear, and exact description.

My invention relates to floats such as are used in flushing tanks and the like containing water or other liquid and controlling the inflow or outflow of the liquid. The present invention is designed as an improvement on the glass float patented by me February 26, 1918, No. 1,257,890.

The special object of the present invention is to improve the patented float, particularly with respect to the means for attaching the hub or nipple by which the float is secured to the float arm of the flushing apparatus, to the end that the means for incorporating the nipple in the float will be characterized by extreme simplicity and of a character to distribute the strains on the glass float tending to break the same, so that the float with the nipple thereon will possess the maximum strength and the firmness of the connection between the nipple and float will be insured.

Reference is to be had to the accompanying drawings forming part of this specification, it being understood that the drawings are merely illustrative of one example of the invention.

Figure 1 is a longitudinal vertical section of a glass float embodying my invention;

Figure 2 is a transverse vertical section as indicated by the line 2—2 of Figure 1; and Figure 3 is a perspective view of the nipple.

In carrying out my invention in accordance with the illustrated example, a closed hollow glass body 10 is provided with a nipple the body being usually oval in longitudinal vertical section and round in cross section. Said body 10 is provided at one end thereof with a horizontally disposed hub or nipple 11. This may be of indurated fibre, metal or the like, said nipple being internally threaded to screw onto the end of the usual float arm (not shown).

The nipple 11 is formed with a base head or flange 12, which is made square as shown or may be of other non-circular form, so that when molded in the glass body the nipple will be prevented from turning. The glass body 10 is formed with a thickened portion 13 in which the flanged end of the nipple 11 is embedded in the molding of the glass body. The said thickened portion 13 includes a backing 14 integral with the body 10 and its said thickened portion and extending continuously at the inner side of the nipple so that the flanged end of the nipple is entirely surrounded by the glass. The thickened portion at the front of the flange 12 overlies the latter, as at 15, on all sides of the nipple 11.

The maximum strength is obtained by the nipple being firmly embedded in the glass and with the thickened portion 13 overlapping as at 15 the flange 12 at the front of the latter. The backing 14 extending over the inner end of the nipple also contributes to the strength of the construction, so that the strains due to the weight of the glass body 10 will be distributed in a manner to prevent the glass from breaking and loosening or detaching the nipple. This is so because the back covering 14 and the thickened overlapping portion 15 take the strain. Only the portion of the nipple for connection with the float arm extends beyond the glass, the anchored end of the nipple being within the material of the glass body.

I would state in conclusion that while the illustrated example constitutes a practical embodiment of my invention, I do not limit myself strictly to the mechanical details herein illustrated, since, manifestly, the same can be considerably varied without departure from the spirit of the invention as defined in the appended claims.

Having thus described my invention, I claim:

1. As an article of manufacture, a float comprising a hollow glass body and a nipple on the body adapted to connect with a float arm, said nipple having a non-circular flange at the inner end thereof embedded in the glass and held by the glass against displacement.

2. As an article of manufacture, a float comprising a hollow glass body and a nipple on the body adapted to connect with a float arm, said nipple having a flange at the inner end thereof embedded in the glass and held by the glass against displacement.

3. As an article of manufacture, a float composed of a hollow glass body and a nipple adapted for attachment to a float arm, said nipple having a flanged inner end and the material of said glass body extending in thickened form about the nipple, the material at the thickened portion overlapping the flange of the nipple at the front thereof and extending over and completely covering the inner end of the nipple forming a backing therefor integral with the thickened overlapping front portion.

JOHN A. LARSON.